(12) United States Patent
Erjawetz et al.

(10) Patent No.: US 8,876,656 B2
(45) Date of Patent: Nov. 4, 2014

(54) SYSTEM FOR DRIVING AN ASSEMBLY ARRANGEMENT FOR A MOTOR VEHICLE

(75) Inventors: Konstantin Erjawetz, Graz (AT); Helfried Müller, Weinzettl (AT)

(73) Assignee: MAGNA STEYR Engineering AG & Co. KG, Graz (AT)

( * ) Notice: Subject to any disclaimer, the term of this patent is extended or adjusted under 35 U.S.C. 154(b) by 339 days.

(21) Appl. No.: 13/381,984

(22) PCT Filed: Jul. 2, 2010

(86) PCT No.: PCT/EP2010/059511
§ 371 (c)(1),
(2), (4) Date: Feb. 2, 2012

(87) PCT Pub. No.: WO2011/000961
PCT Pub. Date: Jan. 6, 2011

(65) Prior Publication Data
US 2012/0129651 A1    May 24, 2012

Related U.S. Application Data

(60) Provisional application No. 61/222,958, filed on Jul. 3, 2009.

(51) Int. Cl.
| | |
|---|---|
| *H02P 15/00* | (2006.01) |
| *B60K 25/02* | (2006.01) |
| *F02B 67/06* | (2006.01) |
| *F02B 67/04* | (2006.01) |
| *F02B 73/00* | (2006.01) |
| *B60K 25/00* | (2006.01) |
| *B60K 1/00* | (2006.01) |
| *B60K 1/04* | (2006.01) |
| *B60K 17/356* | (2006.01) |

(52) U.S. Cl.
CPC . *F02B 73/00* (2013.01); *B60K 1/00* (2013.01); *B60K 25/02* (2013.01); *B60K 1/04* (2013.01); *F02B 67/06* (2013.01); *B60K 17/356* (2013.01); *B60K 2001/0416* (2013.01); *F02B 67/04* (2013.01); *B60K 25/00* (2013.01)
USPC .............................................................. 477/8

(58) Field of Classification Search
USPC ......... 477/2, 3, 5, 7, 8, 11, 12, 166, 167, 181; 903/904–906, 952; 180/65.1, 0.21, 180/0.28, 0.285, 0.31
See application file for complete search history.

(56) References Cited

U.S. PATENT DOCUMENTS 3,719,881 A * 3/1973 Shibata et al. ................. 322/11
7,013,646 B1   3/2006 Serkh et al.
(Continued)

FOREIGN PATENT DOCUMENTS

EP    0715979 A1    6/1996
EP    1522693 A2    4/2005

*Primary Examiner* — Justin Holmes
(74) *Attorney, Agent, or Firm* — Jordan IP Law, LLC; Todd A. Vaughn

(57) ABSTRACT

A system for driving an assembly arrangement for a motor vehicle, which assembly arrangement having at least one auxiliary assembly and an electric machine which is configured independently of a drive unit of the motor vehicle. It is possible for the electric machine to be operated both as a motor for driving the auxiliary assembly and as a generator for generating electric power. If required, it is possible for a separate engine which is configured as an internal combustion engine to be connected or fastened releasably via an interface to the assembly arrangement and to be coupled to the assembly arrangement for drive action, in order to supply the at least one auxiliary assembly and/or the electric machine with rotational drive moment.

19 Claims, 3 Drawing Sheets

(56) References Cited

U.S. PATENT DOCUMENTS

| | | | |
|---|---|---|---|
| 7,174,977 B2* | 2/2007 | Enjoji et al. | 180/65.1 |
| 7,222,692 B2* | 5/2007 | Masuda | 180/291 |
| 7,224,132 B2* | 5/2007 | Cho et al. | 318/139 |
| 7,284,625 B2* | 10/2007 | Jones | 180/53.4 |
| 7,537,070 B2* | 5/2009 | Maslov et al. | 180/65.25 |
| 7,588,117 B2* | 9/2009 | Fukuda | 180/291 |
| 7,726,275 B2* | 6/2010 | Deniston et al. | 123/198 R |
| 2003/0224903 A1* | 12/2003 | Kitamura et al. | 477/5 |
| 2004/0144080 A1* | 7/2004 | Suzuki et al. | 60/276 |
| 2007/0202976 A1* | 8/2007 | Luedtke | 474/70 |
| 2008/0020875 A1* | 1/2008 | Serrels et al. | 474/70 |
| 2009/0255741 A1* | 10/2009 | Major et al. | 180/65.22 |

\* cited by examiner

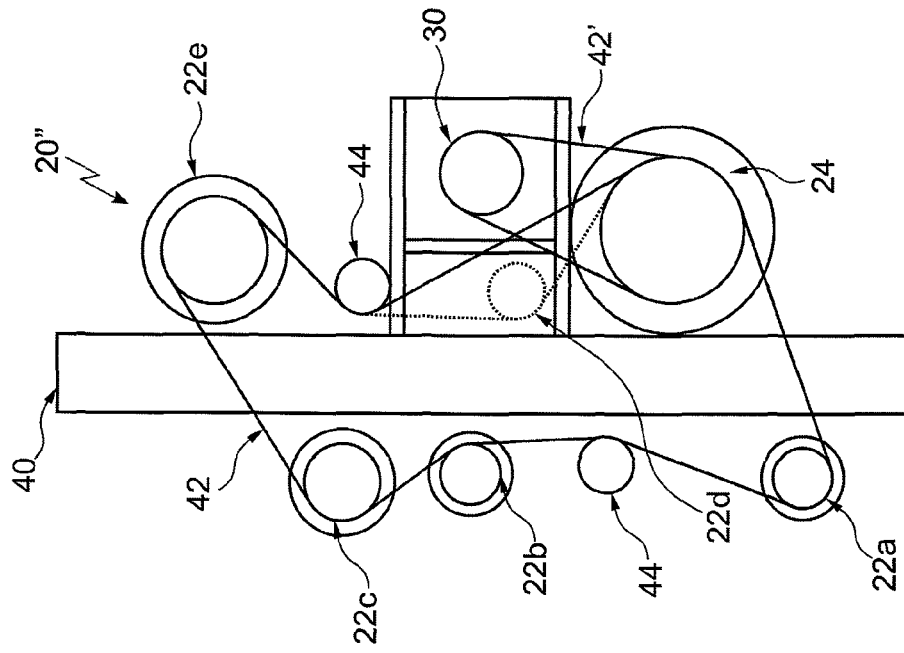
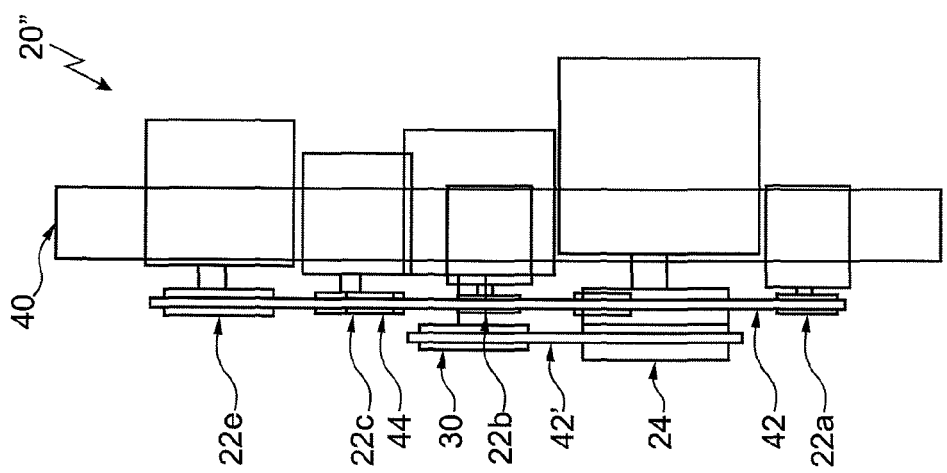

SYSTEM FOR DRIVING AN ASSEMBLY ARRANGEMENT FOR A MOTOR VEHICLE

CROSS-REFERENCE TO RELATED APPLICATIONS

The present application is a National Stage Application of PCT International Application No. PCT/EP2010/059511 (filed on Jul. 2, 2010), under 35 U.S.C. §371, which claims priority to U.S. Provisional Patent Application No. 61/222,958 (filed on Jul. 3, 2009), which are each hereby incorporated by reference in their respective entireties.

FIELD OF THE INVENTION

Embodiments of the present invention relates to a system for driving an assembly arrangement for a motor vehicle.

BACKGROUND OF THE INVENTION

In a conventional vehicle having an internal combustion engine for providing drive torque for driving the vehicle forward, as a rule auxiliary assemblies of the vehicle, such as air conditioning compressors, water and fuel pumps, are driven directly by the internal combustion engine, i.e., are supplied with a torque. In electric and hybrid vehicles, a problem occurs such that when the vehicle is at a standstill, no drive moment which might drive the auxiliary assemblies is provided by the electric motor which acts as drive unit.

In order to solve this problem, instead of rotationally driven auxiliary assemblies, electrically operated auxiliary assemblies can be used which take the energy which is necessary for their operation from a battery of the vehicle. Electrically operated auxiliary assemblies of this type, however, are considerably more expensive than conventional auxiliary assemblies with rotary drive.

SUMMARY OF THE INVENTION

It is therefore an object of the present invention to provide a system for driving an assembly arrangement, which system operates reliably and efficiently and which system is also at the same time inexpensive to produce.

This object may be achieved by a system for driving an assembly arrangement for a motor vehicle, which assembly arrangement including at least one of the following: at least one auxiliary assembly and an electric machine which is configured independently of a drive unit of the motor vehicle. It is possible, therefore, for the electric machine to be operated both as a motor for driving the auxiliary assembly and as a generator for generating electric power. It is also possible, if required, for a separate auxiliary engine which is configured as an internal combustion engine to be fastened releasably via an interface to the assembly arrangement and to be coupled to the assembly arrangement for drive action, in order to supply the auxiliary assembly and/or the electric machine with rotational drive moment.

In accordance with the invention, the system includes at least one of the following: at least one auxiliary assembly and an electric machine which is configured independently of a drive unit of the motor vehicle. The electric machine can be operated both as a motor for driving the auxiliary assembly and as a generator for generating electric power. It is possible, if required, for a separate auxiliary engine which is configured as an internal combustion engine to be fastened releasably via an interface to the assembly arrangement and to be coupled to the assembly arrangement for drive action, in order to supply the at least one auxiliary assembly and/or the electric machine with rotational drive moment.

In essence, the system includes one or more auxiliary assemblies, an electric machine which generates a drive moment if electric energy is applied or vice versa, and an auxiliary engine. If the electric machine is operated as a motor, it drives the at least one auxiliary assembly by providing a rotational drive moment. The latter is transmitted directly or indirectly from the electric machine to the auxiliary assembly which can therefore be configured as a conventional auxiliary assembly. Not every auxiliary assembly, therefore, has to be supplied with electric power to ensure its functional capability. Electric power has to be provided only to the electric machine which is configured separately from a motor which is provided for driving the vehicle forward.

If required, the auxiliary engine is a part of the system but is of separate configuration. Moreover, for example, the auxiliary engine can be mounted at any desired location in the vehicle in a manner which permits decoupling or otherwise detachment from the assembly arrangement when not in use is coupled to the assembly arrangement, in order to make the latter independent of an electric supply or at least to reduce the removal of electric power by the assembly arrangement from an energy storage of the motor vehicle. For this purpose, the auxiliary engine is attached via a suitably designed interface to the assembly arrangement and is also coupled to the latter for drive action. The coupling for drive action can take place directly between the auxiliary engine and the at least one auxiliary assembly. As an alternative or in addition, the electric machine can also be driven by the auxiliary engine.

The interface makes possible rapid and simple coupling of the auxiliary engine to the assembly arrangement. Those parts of the interface which are assigned to the auxiliary engine and the assembly arrangement are preferably configured in such a way that the coupling can also be performed by a user of the motor vehicle who has not been trained specially.

The configuration of the auxiliary engine as an internal combustion engine makes it possible to operate the at least one auxiliary assembly without problems even with limited electric resources. Since the electric machine can also be operated as a generator, the auxiliary engine can additionally also be used to charge the energy storage. The auxiliary engine is coupled to the assembly arrangement, for example, when the energy storage of the vehicle is empty and a certain distance has to be overcome to a charging station, where the energy storage can be charged. After the energy storage has been recharged, the auxiliary engine can be removed. The system can, therefore, be adapted in a simple way to the respectively prevailing conditions.

In accordance with one advantageous embodiment of the invention, a drive moment of an output shaft of the auxiliary engine can be transmitted via a belt drive, a gear mechanism or a positively locking and/or frictional connection to the auxiliary assembly and/or the electric machine.

The auxiliary engine can have a connecting interface which is configured in such a way that a coupling of a fuel system, a control system, an air supply system and/or an exhaust gas system of the auxiliary engine to corresponding components of the motor vehicle can be produced. In essence, certain components of the auxiliary engine can access resources of the motor vehicle via the connecting interface. For example, in a hybrid vehicle, the auxiliary engine can be connected to the fuel system of the vehicle, which fuel system is present in any case, in order to supply the auxiliary engine with fuel. In the case of a failure of the primary internal combustion engine of the hybrid vehicle and an (almost) empty battery, the auxiliary engine can then be operated to supply electric power at least for operating the auxiliary assemblies and/or for emergency operation of an electric drive motor of the vehicle and/or to charge the energy storage of the vehicle.

In principle, the auxiliary engine can also be a module which can be operated independently of the assembly arrangement and includes, in particular, a dedicated fuel tank—which does not rule out the presence of a connecting interface of the above-described type. A modular design of the auxiliary engine facilitates the coupling as required of the auxiliary engine to the assembly arrangement. An auxiliary engine of modular design of this type can in principle be operated independently of other components of the vehicle and can therefore also be used in non-vehicular fields of application (for example, as a generator or drive unit in the leisure, hobby and/or garden sector).

In particular, the auxiliary assembly and/or the electric machine can be decoupled selectively from the connection for drive action to the auxiliary engine via a switchable coupling device, in particular, a magnetic coupling. As a result, depending on the respectively prevailing situation, individual auxiliary assemblies or a plurality of auxiliary assemblies and/or the electric machine can be coupled or decoupled as required, in order to adapt the power requirement of the assembly arrangement on a situation by situation basis to the power output of the auxiliary engine. The power which is generated by the auxiliary engine can be "channeled" as a result. In particular, auxiliary assemblies with a particularly high power requirement and/or auxiliary assemblies which fulfill merely a comfort function are decoupled in certain situations.

In order to facilitate positionally accurate mounting of the auxiliary engine, it can be provided that the interface includes centering apparatuses for the fastening and the coupling for drive action of the auxiliary engine. Furthermore, the interface can be configured in such a way that the auxiliary engine can be fastened to the electric machine and/or the auxiliary assembly. If the assembly arrangement includes a single piece structure element which supports the auxiliary assembly and the electric machine, the auxiliary engine can also be fastened to the structure element.

Mounting of the auxiliary engine is facilitated if the interface has a fastening apparatus which includes a quick action closure system, in particular, with a toggle lever mechanism. It is particularly advantageous if the fastening apparatus can be operated without a tool; it is to be ensured that the fastening can be carried out reliably, simply and quickly.

The auxiliary engine can include a starter device for starting the engine, which starter device can preferably be operated independently of the electric machine. A starter device can include, for example, a cable pull mechanism. It is also possible in principle that a starter device of this type is provided as a redundant starting option for the auxiliary engine, to which recourse is made only when the electric machine is not capable of performing starting of the auxiliary engine. This can occur, for example because the energy storage which supplies it with electric power is empty. Starting of the auxiliary engine by the electric machine can take place, for example, via a control system of the assembly arrangement. The control system can additionally be configured in such a way that starting of the auxiliary engine with the aid of the starter device is detected, in order to take this information into consideration during the actuation of the further components of the assembly arrangement.

In accordance with one advantageous embodiment, the auxiliary engine has a heat and/or sound insulating housing. The heat insulation of the housing makes it possible to remove the auxiliary engine after its operation without a relatively long waiting time for cooling when its drive power is no longer required. The sound insulation proves to be advantageous, in particular, if the auxiliary engine is used in non-vehicular fields of application.

Embodiments of the invention further relates to a motor vehicle, in particular a hybrid or electric vehicle having a system in accordance with at least one of the above-described embodiments.

Embodiments of the invention also relates to a method for operating an assembly arrangement for a motor vehicle, in particular, a hybrid or electric vehicle, which assembly arrangement includes at least one of the following: at least one auxiliary assembly and an electric machine which is configured independently of a drive unit of the motor vehicle. It is possible for the electric machine to be operated both as a motor for driving the auxiliary assembly and as a generator for generating electric power. If required, a separate auxiliary engine which is configured as an internal combustion engine is fastened to the assembly arrangement and is connected to it for drive action, in order to supply the at least one auxiliary assembly and/or the electric machine with rotational drive element.

In accordance with one embodiment of the method, the auxiliary engine is fastened to the assembly arrangement and is connected for drive action to the latter if the drive unit does not supply any drive moment to operate the assembly arrangement and/or a charge state of an energy storage which is assigned to the electric machine has dropped below a predefined threshold value. The auxiliary engine is detached from the assembly arrangement and is stored separately from it if the drive unit supplies sufficient drive moment to operate the assembly arrangement and/or a charge state of the energy storage which is assigned to the electric machine has risen above a predefined threshold value.

In accordance with a further embodiment, the auxiliary assembly and/or the electric machine are/is decoupled selectively from the supply with rotational drive moment via a coupling device, in order to distribute the drive moment which is applied by the auxiliary engine in accordance with requirements.

Further embodiments of the present invention are specified in the description, the drawings and the subclaims.

BRIEF DESCRIPTION OF THE DRAWINGS

The invention is described in more detail in the enclosed figures and drawings, which present an implementation example. The drawings demonstrate:

FIGS. 3A and B diagrammatically illustrates a system for driving an assembly arrangement of a motor vehicle in accordance with a further embodiment of the invention.

DETAILED DESCRIPTION OF EMBODIMENTS

Figure 1:
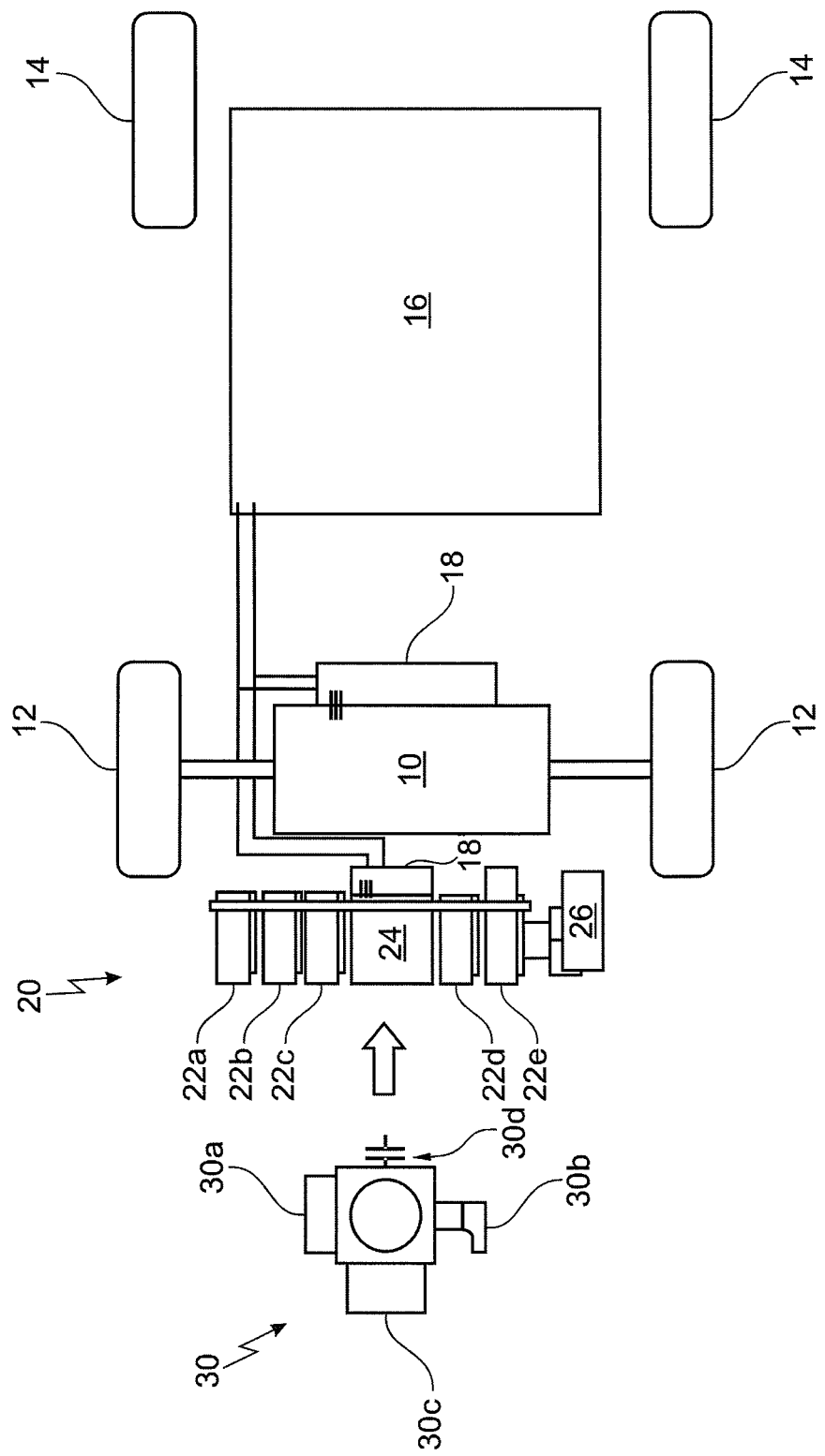
FIG. 1 diagrammatically illustrates a system for driving an assembly arrangement of a motor vehicle in accordance with an embodiment of the invention.

FIG. 1 diagrammatically shows the components of a drive of a motor vehicle. The motor vehicle is an electric vehicle which is driven by an electric motor 10. The electric motor supplies drive moment to at least one of the front wheels 12 and the rear wheels 14 of the vehicle.

The electric motor 10 is supplied with current by a battery 16. The direct current which is supplied by the battery 16 is converted in a DC/AC converter 18 into alternating current which is necessary for the operation of the electric motor 10.

Furthermore, the battery 16 is connected to an assembly arrangement 20 which includes a plurality of auxiliary assemblies 22a to 22e. An auxiliary assembly is to be understood as, for example, an air conditioning compressor, a water pump such as an electric water pump, a vacuum pump such as an electric vacuum pump, a pump for a steering system such as an electric pump, or the like. The auxiliary assemblies 22a to 22e are not drive-connected mechanically or otherwise in mechanical communication with the electric motor 10, i.e., they are not supplied with rotational drive moment by the electric motor 10. As can be gathered from the diagrammatic illustration of FIG. 1, the auxiliary assemblies 22a to 22e are also not connected electrically or otherwise in electric communication with the battery 16. This is also not necessary, since the auxiliary assemblies 22a to 22e are supplied with rotational drive moment by an additional assembly 24. Meaning, auxiliary assemblies 22a to 22e can be conventional-types which are also installed in motor vehicles of conventional type.

The additional assembly 24 can be, for example, an electric machine which is configured to act both as an electric motor and as a generator. Like the electric motor 10, it is connected or otherwise in communication to the battery 16 via a second DC/AC converter 18'.

In essence, operation of the assembly arrangement 20 is ensured by the additional assembly 24 which is a separate component from the electric motor 10. The coupling for drive action of the additional assembly 24 to the auxiliary assemblies 22a to 22e can be produced in any desired way, for example, by one or more belt or chain drives and/or gearwheel connections.

In the present refinement of the assembly arrangement 20, the auxiliary assembly 22e is a generator which supplies current for a 12V power supply 26 of the vehicle. Although it is possible in principle to take the electric power for the 12V power supply 26 from the battery 16, a comparatively expensive DC/DC converter would be necessary for this purpose. Although power losses arise as a result of the use of a conventional generator in comparison with a use of a DC/DC converter, they are compensated for again by cost advantages.

The auxiliary assemblies 22a to 22e can be decoupled selectively from the additional assembly 24 in each case by magnetic couplings which are assigned to them. In this way, it is possible to feed the rotational drive moment which is generated by the additional assembly 24 to those components of the assembly arrangement 20 which are most important in the respective situation in a targeted manner.

If a charge state of the battery 16 is so low that operation of the assembly arrangement 20 to the required extent is no longer ensured, an auxiliary engine 30 is coupled to or otherwise in communication with the assembly arrangement 20. The auxiliary engine 30 is configured to supply the rotational drive moment which is necessary for operation of the assembly arrangement 20 and/or to generate electric power by use of the additional assembly 24 as a generator, which electric power is fed to the battery 16. The auxiliary engine 30, therefore, has two functions which it fulfills alternately or simultaneously: (1) generation of electric power to charge the battery 16; and (2) operation of the auxiliary assemblies 22a to 22e. If the main attention is focused on the charge of the battery 16, the auxiliary assemblies 22a to 22e cart be decoupled selectively, as has already been described briefly above, in order that as much drive moment of the auxiliary engine 30 as possible is converted into electric power by the additional assembly 24. If this aspect is only of subordinate significance, the additional assembly 24 can be decoupled from the rest of the assembly arrangement 20 and/or the auxiliary engine 30, given suitable coupling of the auxiliary engine 30 to the auxiliary assemblies 22a to 22e.

In accordance with the present embodiment, the auxiliary engine 30 is connected to or otherwise in communication with the additional assembly 24, and therefore, drives the latter directly. The auxiliary engine 30 includes an air intake system 30a, an exhaust gas system 30b which is equipped depending on the requirement with exhaust gas treatment devices, and a fuel tank 30c. The connection for drive action of the auxiliary engine 30 to the additional assembly 24 takes place via a coupling element 30d which produces, for example, a positively locking or frictional coupling between a drive shaft of the auxiliary engine 30 and a shaft of the additional assembly 24. Alternative coupling options are likewise conceivable, such as belt or chain connections or a coupling via gearwheels.

The auxiliary engine 30 can also be operated independently of the assembly arrangement 20 and can be used, for example, in the hobby and/or garden sector for operating different types of devices or as a generator. In contrast to the assembly arrangement 20, it is not installed permanently in the motor vehicle. If there is no demand for its drive power, it can be stored at a suitable location for portable use, for example, in the trunk of the vehicle.

The connection between the auxiliary engine 30 and the additional assembly 24 should be configured for being produced quickly and simply, with the result that a person who is not trained expertly can also install the auxiliary engine 30. To this end, the auxiliary engine 30 and the additional assembly 24 have complementary segments of an interface which automatically ensure correct mounting of the auxiliary engine 30, for example, with the aid of suitable centering pins and/or guiding aids. It is preferably possible to fasten the auxiliary engine without tools. For this purpose, in particular, quick action clamping systems with a toggle lever mechanism are provided.

Figure 2:
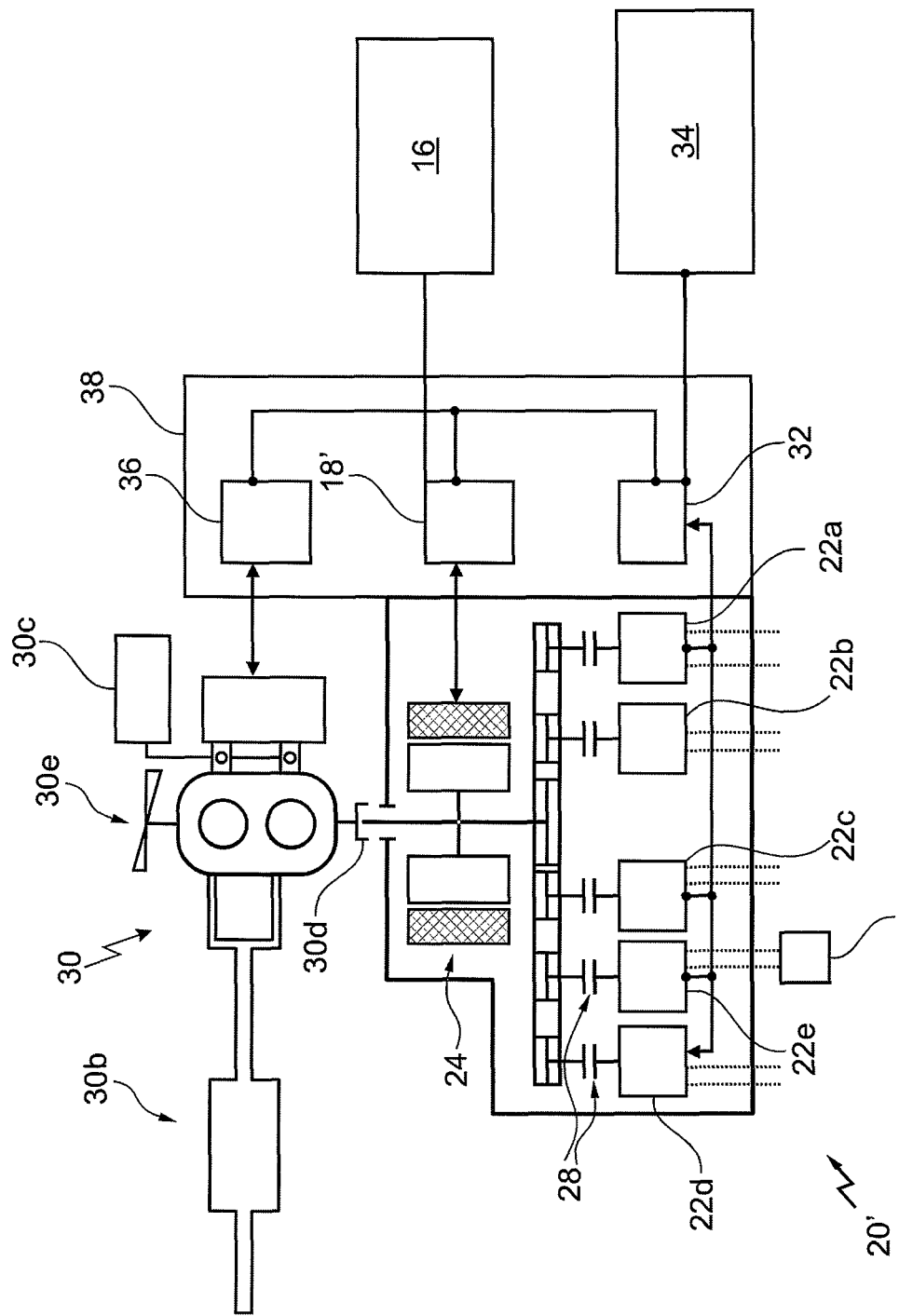
FIG. 2 diagrammatically illustrates a system for driving an assembly arrangement of a motor vehicle in accordance with another embodiment of the invention.

The interface for connecting the auxiliary engine 30 to the assembly arrangement is preferably readily accessible, in order to simplify the mounting of the units. The rotational axes of the auxiliary engine 30 and the auxiliary assemblies 22a to 22e and of the additional assembly 20 do not necessarily have to be arranged parallel to one another, if the available installation space does not make an arrangement of this type possible FIG. 2 illustrates an assembly arrangement 20', the components of which are arranged in a spatially somewhat different form, when compared to the assembly arrangement 20 of FIG. 1. Moreover, it can be seen that the individual auxiliary assemblies 22a to 22e can be decoupled from the additional assembly 24 by coupling units 28, With the exception of the auxiliary assembly 22b, a water pump in the present embodiment, the auxiliary assemblies 22a to 22e are connected to or otherwise in communication with a control unit 32 which is in turn connected to or otherwise in communication with a CAN bus 34 of the vehicle. The converter 18' and an auxiliary engine control unit 36 are also actuated via the control unit 32. The control unit 32, the converter 18' and the auxiliary engine control unit 36 together form an assembly arrangement controller 38.

In addition to the components which are illustrated in FIG. 1, the auxiliary engine has a fan 30e which is configured to cool the auxiliary engine 30 if required, and thus, also to be able to maintain longer "emergency operation" of the assembly arrangement 20'. An extension of the maximum operating duration of the auxiliary engine 30 without intervention by the user is possible, in particular, when the fuel tank 30c and/or the exhaust gas system 30b are/is connected to corresponding systems of the vehicle if present. Cooling of the auxiliary engine 30 can also be associated with a cooling system of the vehicle.

FIGS. 3A and 3B illustrate a further embodiment of an assembly arrangement 20" in a plan view (FIG. 3A) and in a side view (FIG. 31B). Like the additional assembly 24, the individual auxiliary assemblies, namely, a power steering pump 22a, a water pump 22b, an air conditioning compressor 22c, a vacuum pump 22d and a generator 22e, are fastened or connected to a crossmember 40 which is installed fixedly at a suitable location of the vehicle, in particular in the region of the drive. The auxiliary assemblies 22a to 22e are connected for drive action to the additional assembly 24 via a belt 42. In order to constantly ensure a suitable tension of the belt 42, belt tensioners 44 are provided.

In contrast to the systems described using FIGS. 1 and 2, the auxiliary engine 30 is not fastened or connected to the additional assembly 24 here. The fastening can take place, for example, to one of the auxiliary assemblies. In FIGS. 3A and 3B, the fastening takes place by way of example to the vacuum pump 22d, since this results in an overall particularly compact design of the system which includes assembly arrangement 20" and auxiliary engine 30. The coupling for drive action of the auxiliary engine 30 to the additional assembly 24 takes place via a second belt 42' which is arranged in a plane parallel to the belt 42. Although the non-coaxial arrangement of the drive shaft of the auxiliary engine 30 and the additional assembly 24 requires the use and installation of an additional coupling element, namely the belt 42', this additional mounting is simple to bring about and the coupling element 30d illustrated in FIG. 1 is dispensed with. Moreover, the system has a reduced installation space requirement in the axial direction of the components. In addition, in accordance with one special embodiment, the transmission ratio between the auxiliary engine 30 and the additional assembly 24 can be adapted to the respective requirements of the components by a suitable selection of the belt pulley diameter.

The configuration of the assembly arrangement 20" makes it possible in a simple way to decouple the additional assembly 24 functionally (for example, by a coupling unit on its drive shaft), in order to drive only the auxiliary assemblies 22a to 22e by the auxiliary engine 30 in certain situations.

The auxiliary engine 30 is preferably enclosed, in order that sound insulation and thermal insulation are ensured. The thermal insulation makes it possible to dismantle the auxiliary engine 30 even in a "warm" state. Moreover, the enclosure can be configured in such a way that an air flow over the engine 30 is formed as advantageously as possible, in order to cool said engine 30 efficiently.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A drive system for a motor vehicle, the drive system comprising:
an assembly arrangement having at least one auxiliary assembly and an electric machine which is configured independently of a drive unit of the motor vehicle, the electric machine being configured for operation as a motor for driving the at least one auxiliary assembly and as a generator for generating electric power, and an auxiliary engine configured as an internal combustion engine which is releasably fastened via an interface to the assembly arrangement to provide a rotational drive moment to at least one of the at least one auxiliary assembly and the electric machine, wherein the auxiliary engine comprises an output shaft having the rotational drive moment transmitted via one of a belt drive, a gear mechanism or a positively locking and/or frictional connection to the auxiliary assembly and/or the electric machine.

2. The drive system of claim 1, wherein the auxiliary engine comprises at least one of a fuel system, a control system, an air supply system, an exhaust gas system and an connecting interface configured to permit coupling of the auxiliary engine to corresponding components of the motor vehicle.

3. The drive system of claim 1, wherein the auxiliary engine comprises a dedicated fuel tank, the auxiliary engine being configured for operation independently of the assembly arrangement.

4. The drive system of claim 1, further comprising a switchable coupling device configured to selective decouple at least one of the auxiliary assembly and the electric machine from a connection for drive action to the auxiliary engine.

5. The drive system of claim 4, wherein the switchable coupling device comprises a magnetic coupling.

6. The drive system of claim 1, wherein the interface comprises a plurality of centering apparatuses configured to mount the auxiliary engine.

7. The drive system of claim 1, wherein the interface is configured to permit fastening of the auxiliary engine to one of the electric machine and the auxiliary assembly.

8. The drive system of claim 1, wherein the interface comprises a fastening apparatus having a quick action closure system with a toggle lever mechanism.

9. The drive system of claim 1, wherein the assembly arrangement comprises a single piece structure element configured to support the auxiliary assembly and the electric machine.

10. The drive system of claim 1, wherein the auxiliary engine comprises a starter device for starting the auxiliary engine, the starter device being configured for operation independently of the electric machine.

11. The drive system of claim 1, wherein the auxiliary engine comprises at least one of a heat and sound insulating housing.

12. A motor vehicle comprising:
an assembly arrangement having at least one auxiliary assembly and an electric machine which is configured independently of a drive unit of the motor vehicle, the electric machine being configured for operation as a motor for driving the at least one auxiliary assembly and as a generator for generating electric power, an auxiliary engine configured as an internal combustion engine which is releasably fastened via an interface to the assembly arrangement to provide a rotational drive moment to at least one of the at least one auxiliary assembly and the electric machine, wherein the auxiliary engine comprises an output shaft having the rotational drive moment transmitted via one of a belt drive, a gear mechanism or a positively locking and/or frictional connection to the auxiliary assembly and/or the electric machine.

13. The motor vehicle of claim 12, wherein the motor vehicle comprises a hybrid motor vehicle.

14. The motor vehicle of claim 12, wherein the motor vehicle comprises an electric motor vehicle.

15. A method for operating an assembly arrangement of a motor vehicle, the method comprising:
providing an assembly arrangement having at least one auxiliary assembly and an electric machine which is configured independently of a drive unit of the motor vehicle, wherein the electric machine is configured for operation as a motor for driving the at least one auxiliary assembly and as a generator for generating electric power; and then
providing an auxiliary engine configured as an internal combustion engine which is releasably fastened via an interface to the assembly arrangement to provide a rotational drive moment to at least one of the at least one auxiliary assembly and the electric machine, wherein the auxiliary engine comprises an output shaft having the rotational drive moment transmitted via one of a belt drive, a gear mechanism or a positively locking and/or frictional connection to the auxiliary assembly and/or the electric machine.

16. The method of claim 15, further comprising operationally fastening the auxiliary engine to the assembly arrangement if at least one of the drive unit does not supply any drive moment to operate the assembly arrangement and a charge state of an energy storage which is assigned to the electric machine is less than a predetermined value.

17. The motor vehicle of claim 15, further comprising operationally detaching the auxiliary engine from the assembly arrangement and storing the auxiliary engine separately therefrom if at least one of the drive unit supplies drive moment sufficient to operate the assembly arrangement and the charge state of the energy storage which is assigned to the electric machine is greater than a predetermined value.

18. The method as claimed in claim 15, further comprising selectively decoupling at least one of the auxiliary assembly and the electric machine from the auxiliary engine via a coupling device in order to distribute the drive moment which is applied by the auxiliary engine in accordance with requirements.

19. The method of claim 15, wherein the motor vehicle comprises one of a hybrid motor vehicle and an electric motor vehicle.

* * * * *